Oct. 26, 1965 J. J. HICKEY ETAL 3,214,694

PUSH-PULL PULSE DEFLECTION CIRCUIT

Filed Oct. 17, 1963 2 Sheets-Sheet 1

INVENTORS
JOHN J. HICKEY
GARY A. KOMATSU
BY Jerry A. Dinardo
AGENT

Oct. 26, 1965 J. J. HICKEY ETAL 3,214,694

PUSH-PULL PULSE DEFLECTION CIRCUIT

Filed Oct. 17, 1963 2 Sheets-Sheet 2

JOHN J. HICKEY
GARY A. KOMATSU
INVENTORS

BY Jerry A. Dinardo

AGENT 3,214,694
Patented Oct. 26, 1965

3,214,694

PUSH-PULL PULSE DEFLECTION CIRCUIT

John J. Hickey, Hawthorne, and Gary A. Komatsu, Gardena, Calif., assignors to TRW Inc., a corporation of Ohio Filed Oct. 17, 1963, Ser. No. 316,871
10 Claims. (Cl. 328—60)

Figure 1:
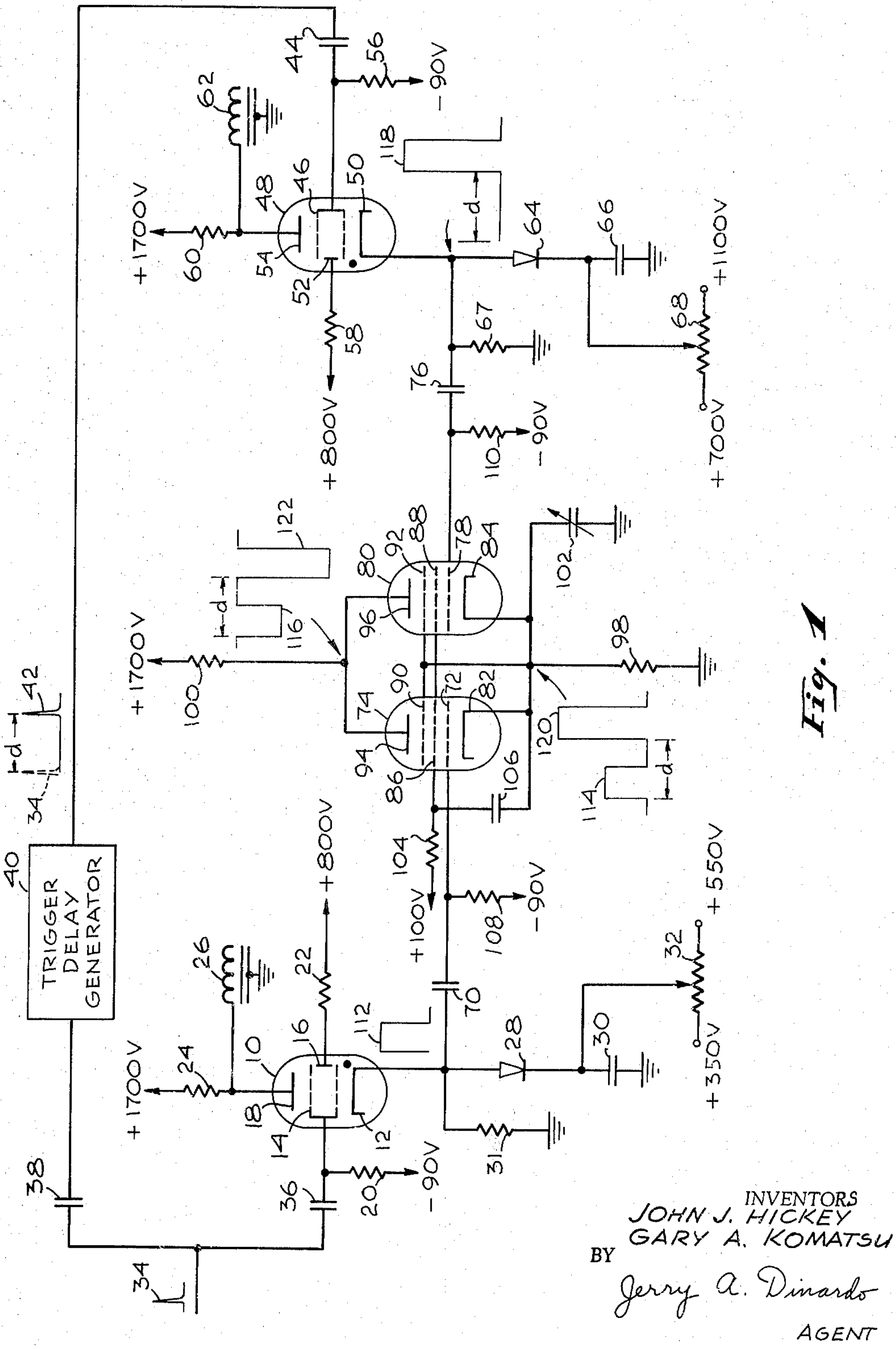

This invention relates to rectangular pulse generating circuits and particularly to circuits capable of generating high voltage timed rectangular pulses of differing amplitudes for use in electrosatic deflection of electron beams.

It is often necessary to generate accurately timed rectangular pulses having amplitudes of 400 volts and higher. An electrostatically deflected image converter camera tube, for example, requires large deflection voltages for high speed framing operation. An ultrahigh speed electronic comera system is disclosed in U.S. Patent 3,096,484, issued July 2, 1963, to George L. Clark. In the past, such camera systems have employed either equal amplitude voltage pulses or step voltages for producing the required electrostatic deflection. The circuits that produce step voltages suffer from the disadvantage that they consume high power to maintain flatness of the steps. On the other hand, the circuits that employ equal amplitude pulses are required to generate relatively high voltage pulses, since these circuits preclude push-pull deflection.

Accordingly, an object of this invention is to provide new and improved circuitry for generating high voltage accurately timed, rectangular pulses of differing amplitudes for use in electrostatic deflection circuits.

A further object is to reduce the power requirements of circuits designed to produce push-pull deflection voltages for image converter camera tubes and similar electron beam devices.

The foregoing and other objects are achieved in accordance with the invention through the provision of a push-pull deflection pulse generator that furnishes time spaced deflection pulses of differing amplitudes by applying driving signals at timed spaced intervals to two parallel connected pulse splitter networks. In accordance with one embodiment, a trigger pulse is fed to a first rectangular pulse generator to generate a first rectangular pulse. The trigger pulse is also fed to a delay generator and then to a second rectangular pulse generator to generate a second rectangular pulse that is delayed with respect to the first rectangular pulse. The time delayed rectangular pulses are fed to separate inputs of two parallel connected phase splitters to produce two sets of equal and opposite rectangular output pulses. Means are provided for limiting the amplitudes of the sets of rectangular output pulses to different predetermined levels. In one embodiment the amplitude limiting means are provided in the input circuits of the phase splitters, while in another embodiment the amplitude limiting means are provided in the oppositely phased output circuits.

Figure 2:
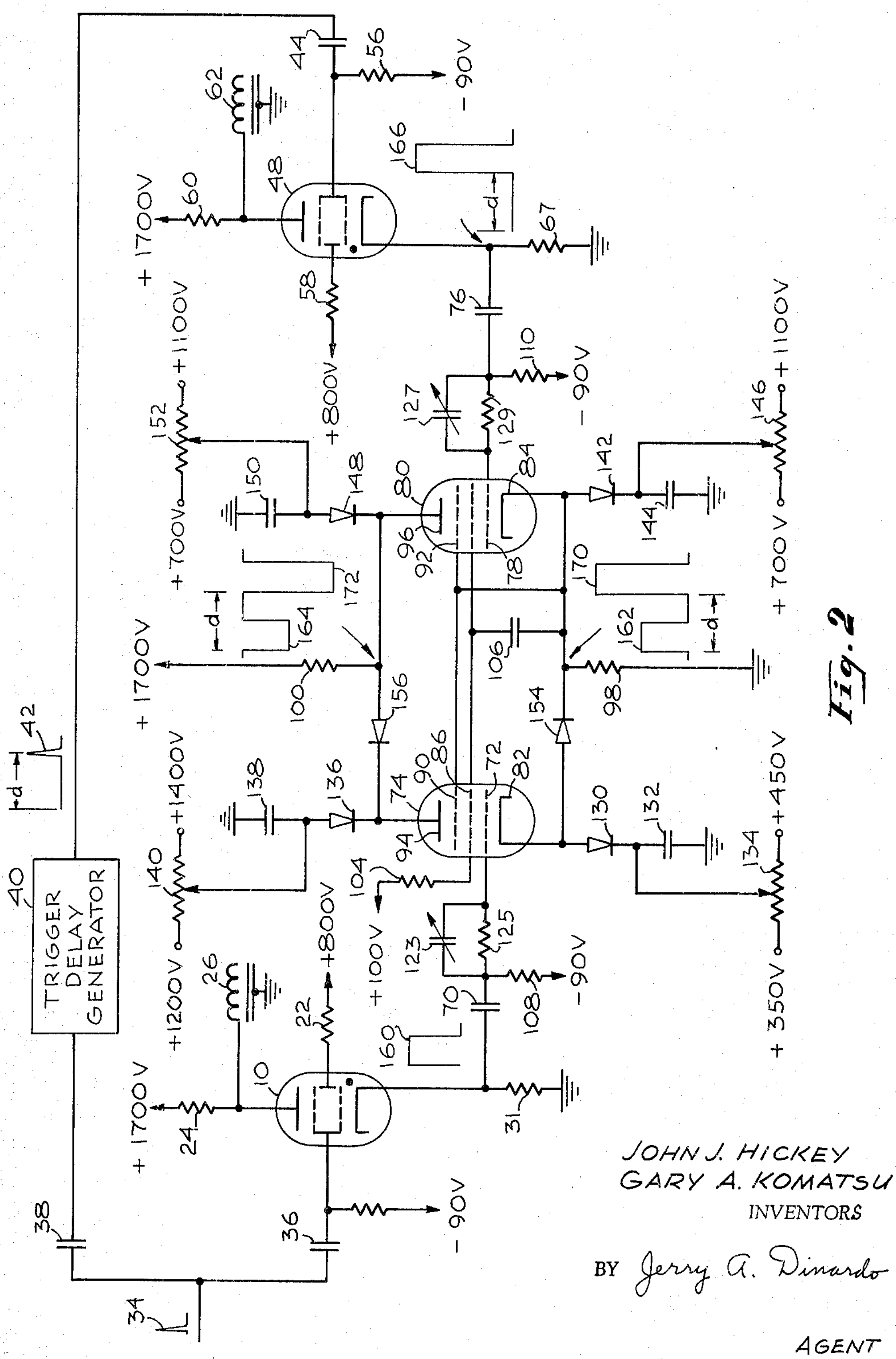

In the drawing, wherein like reference numerals refer to like parts:

FIG. 1 is a schematic circuit illustrating an embodiment of the push-pull pulse deflection circuit of the invention; and FIG. 2 is a schematic circuit illustrating another embodiment of the invention.

Referring to FIG. 1, there is shown a first rectangular pulse generating circuit comprising a first thyratron switching tube 10, which is preferably a tetrode, such as a type 2D21. The first thyratron 10 includes a cathode 12, a control electrode 14, a primary anode 16 surrounded by a control electrode 14, and a secondary anode 18 spaced from the control electrode 14. As depicted herein, the switching tube 10 is preferably connected and operated in a nonconventional manner in order to gain certain advatages such as faster switching action. For example, the control electrode 14, or the electrode which triggers the tube into conduction, usually functions as a shield electrode in conventional circuits, and the primary anode 16 usually is used as a control grid to trigger the tube 10 into conduction.

The control electrode 14 is biased to cutoff through a grid bias resistor 20. The grid bias potential is typically −90 volts. The primary anode 16 is connected to a positive potential of about 850 volts through a resistor 22.

The secondary anode 18 is connected to a positive potential of about 1700 volts through a charging resistor 24. A pulse forming device, such as a delay line 26 is connected between the secondary anode 18 and ground.

A diode 28 and a capacitor 30 are connected in series between the cathode 12 and ground and in parallel with a cathode load resistor 31. The capacitor 30 is charged to a positive potential through connection to a potentiometer 32. The potential on the capacitor 30, which places a reverse bias on the cathode of the diode 28, is variable between 350 and 550 volts, and typically is set at 450 volts. A first portion of an input trigger pulse 34 is coupled through a coupling capacitor 36 to the control electrode 14 of the first thyratron 10. A second portion of the trigger pulse 34 is coupled through another coupling capacitor 38 to a trigger delay generator 40. The trigger delay generator 40 generates a second trigger pulse 42 that is delayed a predetermined interval "*d*" relative to the input trigger pulse 34. For a circuit which can be used as the trigger delay generator 40, reference is made to copending application of George L. Clark and John J. Hickey, Serial No. 92,083, filed February 27, 1961, entitled "Wave Generating Circuit." Other delay circuits capable of generating delays in the microsecond range and output pulses of 300 volts with rise times of 100 nanoseconds can be used. The delayed trigger pulse 42 is fed through a coupling capacitor 44 to the control electrode 46 of a second thyratron 48. The second thyratron 48 is connected in a second rectangular pulse generating circuit similar to the first one except for certain component values which make the amplitude of the rectangular output pulse greater than that of the first rectangular pulse generating circuit. Accordingly, the second thyratron 48 is provided with a cathode 50, a primary anode 52, and secondary anode 54.

The control electrode 46 is biased at −90 volts through a grid bias resistor 56. The primary anode 52 is connected to a positive potential of about 850 volts through a resistor 58.

The secondary anode 54 is connected to a positive potential of about 1700 volts through a charging resistor 60. A delay line 62 is connected between the secondary anode 54 and ground.

A diode 64 and capacitor 66 are connected between the cathode 50 and ground and in parallel with a cathode load resistor 67. The capacitor 66 and cathode of the diode 64 receive a positive potential of 850 volts from a potentiometer 68, the potential being adjustable between 700 and 100 volts, for example.

The output of the first rectangular pulse generating circuit is coupled from the cathode 12 of the first thyratron 10 through a coupling capacitor 70 to the control grid 72 of a first vacuum tube 74. The output of the second rectangular pulse generating circuit is coupled from the cathode 50 of the second thyratron 48 through a coupling capacitor 76 to the control grid 78 of a second vacuum tube 80. The vacuum tubes 74 and 80, preferably pentodes, have their output circuits connected in parallel in a phase splitter circuit. Thus the cathodes 82 and 84 are connected together, as are the screen grids 86, 88, suppressor grids 90, 92, and anodes 94, 96.

A cathode load resistor 98 is connected between the cathodes 82, 84 and ground, and a plate load resistor 100 is connected between the anodes 94, 96, and a positive supply of about 1700 volts. A variable capacitor 102 is connected across the cathode load resistor 98. The screen grids 86 and 88 receive a positive potential of about 100 volts through a screen resistor 104. A capacitor 106 between the screen grids 86, 88 and cathode maintains the screen grid potential constant.

The first vacuum tube 74 receives a control grid bias of about −90 volts through a grid resistor 108. The second vacuum tube 80 receives a similar bias through a grid resistor 110. This biases both tubes 74 and 80 beyond cutoff.

The operation will now be described. Prior to the application of the trigger pulse 34, thyratrons 10 and 48 are nonconducting and delay lines 26 and 62 are charged to the potential of the anode supply, in this case 1700 volts. The cathodes 12 and 50 are at ground potential, the voltage across the diode 28 is 450 volts and the voltage across diode 64 is 850 volts. Vacuum tubes 74 and 80 are also nonconducting.

The portion of the trigger pulse 34 applied to the control electrode 14 of the first thyratron 10 is sufficient to overcome the 90 volt bias thereon so that thyratron 10 is rendered conducting. Delay line 26 thereupon discharges through the thyratron 10, causing a high pulse of current to flow through cathode load resistor 31 and causing the voltage across resistor 31 to rise abruptly towards 850 volts which results from a proper impedance match between delay line 28 and resistor 31. However, the voltage across cathode load resistor 31 is limited in amplitude to 450 volts, for when the potential of cathode 12 reaches 450 volts diode 28 will conduct. Thus, the cathode 12 cannot rise above the potential of the capacitor 30, which is at 450 volts. The pulse of current has a duration which is dependent on the length of the delay line 26, after which it falls to zero. Accordingly, an extremely flat topped 450 volt rectangular pulse 112 is generated at the cathode 12 of thyratron 10.

The rectangular pulse 112 is coupled to the control grid 72 of the first vacuum tube 74. The phase splitting action of vacuum tube 74 causes a corresponding rectangular pulse 114 of the same polarity as, and of slightly less amplitude than, the pulse 112 to develop across the cathode load resistor 98. In addition, a rectangular pulse 116 equal and opposite in polarity to the pulse 114 is developed across the plate load resistor 100 which is of the same resistance value as cathode load resistor 98. The rectangular pulses 114 and 116 constitute the first pair of two sets of pulses which can be used as push-pull deflection pulses for electrostatic deflection purposes.

In a similar manner, the portion of trigger pulse 34 that is coupled to the delay generator 40 develops a corresponding delayed trigger pulse 42 that is fed to the control electrode 46 of the second thyratron 48. When thyratron 48 fires, the delay line 62 discharges through the tube 48 and resistor 67, producing at the cathode 50 a voltage which rises towards a value in excess of 850 volts due to a deliberate mismatch of delay line 62 and cathode load resistor 67. The voltage is limited in amplitude to the voltage across diode 64, in this case 850 volts, or approximately twice the voltage of pulse 112. Accordingly, a second rectangular pulse 118 is produced which is delayed relative to the first pulse 112 by the interval "*d*."

The second rectangular pulse 118 is coupled to the grid 78 of the second vacuum tube 80. Phase splitting action of the tube 80 causes a positive output pulse 120 to be developed across the cathode load resistor 98 and a negative output pulse 122 to be developed across the plate load resistor 100. Pulses 120 and 122, which are slightly smaller in amplitude than the input rectangular pulse 118, constitute the second pair of the two sets of deflection pulses. The set of pulses 114 and 120 are of one polarity but of different amplitude, and are spaced by a given delay time "*d*." The other set of pulses 116 and 122 are equal and opposite in polarity and time coincident with pulses 114 and 120 respectively, and are spaced by the same delay time "*d*."

In connection with the phase splitter tubes 74 and 80, during the rise time of the output pulses 114, 116 and 120, 122, there is a difference in the anode and cathode currents due to the flow of control grid current. The variable capacitor 102 is provided to slow down the rise in cathode voltage to insure that both anode 94 or 96 and cathode 82 or 84 will reach their equilibrium voltages simultaneously. Capacitor 102 should be adjusted such that the pulses on the anode will have a minimum of overshoot and a maximum of flatness.

Typical circuit values for the circuit of FIG. 1 are as follows:

| | |
|---|---|
| Thyratrons 10, 48 | Type 2D21. |
| Resistors 20, 56 | 10K. |
| Resistors 22, 58 | 1M. |
| Resistors 24, 60 | 3M. |
| Delay line 26, 62 | 10 μsec., 1000 ohms. |
| Diode 28 | (3) 1N643. |
| Capacitor 30 | 10 μfd. |
| Resistor 31 | 1K. |
| Potentiometers 32, 68 | 50K. |
| Capacitors 36, 38, 44 | 100 pf. |
| Diode 64 | (6) 1N643. |
| Capacitor 66 | 10 μfd. |
| Resistor 67 | 1200 ohms. |
| Capacitors 70, 76 | 1/10 μfd. |
| Vacuum tubes 74, 80 | Type 6AU6. |
| Resistors 98, 100 | 100K. |
| Capacitor 102 | 10–100 pf. |
| Resistor 104 | 1M. |
| Capacitor 106 | 1 μfd. |
| Resistors 108, 110 | 100K. |

In the foregoing embodiment, the amplitudes of the output pulses were controlled by amplitude limiting action occurring prior to the application of pulses 112 and 118 to the grid circuits of the phase splitter tubes 74 and 80. In the next embodiment, amplitude limiting action is performed in the cathode and plate circuits of the phase splitter tubes 74 and 80.

Referring to FIG. 2, it is seen that the pulse limiting circuits are removed from the cathode load resistors 31 and 67 of the thyratrons 10 and 48. Also, since the limiting circuits are provided across the cathode and plate load resistors 98 and 100 of the phase splitter tubes 74 and 80, the adjustable capacitor 102 is dispensed with. The suppressor grids 90 and 92 of tubes 74 and 80 are tied together and to the cathode 84 of tube 80. The screen capacitor 106 is also tied to the cathode 84. In series with the control grid 72 of the first pulse splitter tube 74 is a capacitor 123 in parallel with a resistor 125. In series with the control grid 78 of the second phase splitter tube 80 is a capacitor 127 in parallel with a resistor 129.

A pulse limiting means in the cathode circuit of the first vacuum tube 74 includes a diode 130 and capacitor 132 in series between the cathode 82 and ground. The diode 130 is back biased at 400 volts by connection of its cathode to a potentiometer 134 maintained at positive potentials. Another pulse limiting means in the anode circuit of the first vacuum tube includes a diode 136 and capacitor 138 connected in series between the anode 94 and ground. The anode of the diode 136 is connected to a positive potential of 1300 volts through a potentiometer 140.

Similarly, pulse limiting means in the cathode circuit of the second vacuum tube 80 includes a diode 142 and a capacitor 144 connected in series between the cathode 84 and ground. The cathode of the diode 42 is connected to a potentiometer 146 to establish a reverse bias of about 800 volts positive thereon. In the anode circuit, a diode 148 and capacitor 150 are connected in series between the anodes 96 and ground. The anode of the diode is connected to a potentiometer 152 to establish a potential of about 900 volts positive thereon.

A diode 154 has its anode connected to the cathode 82 of the first vacuum tube 74 and its cathode connected to the cathode load resistor 98. Another diode 156 has its anode connected to the anode load resistor 100 and its cathode connected to the anode 94 of the first vacuum tube 74.

In all other respects, the circuit of FIG. 2 is the same as that of FIG. 1.

Prior to the application of the trigger pulse 34, all tubes 10, 48, 74, 80 are nonconducting. Their anodes are all at 1700 volts and their cathode at 0 volt. This places a back bias of 400 volts on diodes 130 and 136, and 800 volts on diodes 142 and 148.

In operation, that portion of input trigger pulse 34 fed to the first thyratron 10 fires the latter, whereupon a rectangular voltage pulse 160 is generated across the cathode load resistor 31. The amplitude of the voltage pulse 160 depends on the relative impedance of cathode resistor 31 and delay line 26. In a preferred case the resistor 31 is related to the characteristic impedance of delay line 26, such that the amplitude of the pulse 160 is appreciably less than one-half the anode supply voltage, or about 500 volts, for example.

The rectangular pulse 160 is coupled to the grid of the first vacuum tube 74 through coupling capacitor 70 and current limiting resistor 125, causing current to flow through anode load resistor 100, diode 156, tube 74, diode 154 and cathode load resistor 98. The voltage at the cathode 82 tends to rise towards 850 volts positive, but when it reaches the back bias level of the diode 130, namely 400 volts, diode 130 conducts, thereby clipping the voltage at the cathode 82 and across cathode load resistor 98 to 400 volts and producing a flat topped rectangular pulse 162. Similarly, the voltage at the anode 94 tends to fall and when it drops to the back bias level of diode 136, diode 136 conducts, thereby clipping the voltage at the anode 94 at the bias level. The amplitude of the flat topped rectangular voltage pulse 164 thus produced across the anode load resistor 100 will then be equal to the supply voltage minus the bias voltage, in this case 400 volts. Capacitor 123 provides an initial overdrive to the grid of tube 74 to steepen the leading edges of pulses 162 and 164.

In a similar manner, the delayed trigger pulse 42 causes thyratron 48 to fire thereby generating a rectangular pulse 166 of greater than 850 volts across the cathode load resistor 67. This pulse amplitude is obtained by judicious choice of resistor 67 relative to delay line 48 impedance. The pulse 166 is fed to the grid 78 of the second vacuum tube 80, where limiting action at the cathode 84 clips the voltage developed across cathode load resistor 98 to 800 volts and limiting action at the anode 96 clips the voltage developed across anode load resistor 100 to 800 volts. Accordingly, flat topped rectangular pulses 170 and 172 are produced at the cathode 84 and anode 96, respectively, of tube 80. Diodes 154 and 156 prevent these larger pulses from being clipped by diodes 130 and 136.

Typical circuit values for the circuit of FIG. 2 are as follows:

| | |
|---|---|
| Thyratrons **10**, **48** | Type 2D21. |
| Resistors **20**, **56** | 10K. |
| Resistors **22**, **58** | 1M. |
| Resistors **24**, **60** | 3M. |
| Delay lines **26**, **62** | 10 $\mu$sec., 1000 ohms. |
| Resistor **31** | 360 ohms. |
| Capacitors **36**, **38**, **44** | 100 pf. |
| Resistor **67** | 1200 ohms. |
| Capacitor **70**, **76** | $\frac{1}{10}$ $\mu$fd. |
| Vacuum tubes **74**, **80** | Type 6AU6. |
| Resistors **98**, **100** | 100K. |
| Resistor **104** | 1M. |
| Capacitor **106** | 1 $\mu$fd. |
| Resistors **108**, **110** | 100K. |
| Capacitors **123**, **127** | 3–40 pf. |
| Resistors **125**, **129** | 10K. |
| Diodes **130**, **136** | (3) 1N643. |
| Capacitors **132**, **138**, **144**, **150** | 10 $\mu$fd. |
| Potentiometers **134**, **140**, **146**, **152** | 50K. |
| Diodes **142**, **148** | (6) 1N643. |
| Diodes **154**, **156** | (3) 1N643. |

The embodiments of the invention in which an exclusive property or privilege is claimed are defined as follows:

1. A push-pull deflection pulse generator comprising:
means responsive to a first trigger pulse for producing two time spaced rectangular input pulses;
a pair of phase splitters having their corresponding output circuits connected in parallel and having separate input circuits;
means for coupling said time spaced rectangular pulses to different ones of said input circuits to produce first and second sets of time spaced rectangular output pulses, with the pulses of said first set being of opposite polarity to the pulses of said second set;
and means for limiting the amplitudes of the pulses of each set at two different discrete levels.

2. The invention according to claim 1, wherein said pulse amplitude limiting means comprises means for limiting the amplitudes of said two time spaced rectangular input pulses.

3. The invention according to claim 1, wherein said pulse amplitude limiting means is included in the output circuits of said phase splitters.

4. A push-pull deflection pulse generator comprising:
means responsive to a first trigger pulse for producing two time spaced input rectangular pulses;
a pair of vacuum tube phase splitters having their corresponding cathode and anode output circuits connected in parallel and having separate input circuits;
means for coupling said time spaced rectangular pulses to different ones of said input circuits to produce first and seconds sets of time spaced rectangular output pulses, with the pulses of said first set being of opposite polarity to the pulses of said second set;
and means for limiting the amplitudes of the pulses of each set at two different discrete levels;
said pulse amplitude limiting means comprising a back biased diode and a capacitor connected in series in each cathode and anode circuit of each of said phase splitters.

5. A push-pull deflection pulse generator comprising:
means responsive to a first trigger pulse for producing two time spaced input rectangular pulses;
a pair of vacuum tube phase splitters having their corresponding cathode and anode output circuits connected in parallel and having separate input circuits;
means for coupling said time spaced rectangular pulses to different ones of said input circuits to produce first and second sets of time spaced rectangular output pulses, with the pulses of said first set being of opposite polarity to the pulses of said second set;
means for limiting the amplitudes of the pulses of each set at two different discrete levels;
said pulse amplitude limiting means comprising voltage clipping circuits in the cathode and anode circuits of each of said phase splitters;
and means for preventing the larger amplitude output pulse of each set from being clipped by the voltage clipping circuit which forms the smaller amplitude output pulse of each set.

6. A push-pull deflection pulse generator comprising:
pulse generating means responsive to a first trigger pulse for producing two time spaced input rectangular pulses;
said pulse generating means comprising two discharge circuits each including a thyratron, an energy storage device connected in the anode circuit thereof, and a resistor connected in the cathode circuit thereof;

means connected across one of said resistors to limit the amplitude of the voltage developed thereacross at one discrete level;

means connected across the other resistor to limit the amplitude of the voltage developed thereacross at a substantially different discrete level;

a pair of phase splitters having their corresponding output circuits connected in parallel and having separate input circuits;

and means for coupling the voltages across said resistors to different ones of said input circuits to produce first and second sets of time spaced rectangular output pulses of substantially differing amplitudes, with the pulses of said first set being of opposite polarity to the pulses of said second set.

7. A push-pull deflection pulse generating circuit comprising:

means for producing a first rectangular voltage pulse;

means for producing a second rectangular voltage pulse delayed a predetermined interval with respect to said first pulse;

first and second phase splitters having common oppositely phased load circuits;

means for coupling said first rectangular pulse to the input circuit of said first phase splitter to produce a first pair of coincident oppositely phased rectangular voltage pulses across said load circuits;

means for coupling said second rectangular pulse to the input circuit of said second phase splitter to produce across said load circuits a second pair of oppositely phased coincident rectangular voltage pulses delayed said predetermined interval relative to said first pair of coincident pulses;

voltage clipping means for limiting the amplitudes of the pulses of said first pair to predetermined levels;

and voltage clipping means for limiting the amplitudes of the pulses of said second pair to levels that are greater than said predetermined levels.

8. A push-pull deflection pulse generating circuit comprising:

means for producing a first rectangular voltage pulse of predetermined amplitude;

means for producing a second rectangular voltage pulse delayed a predetermined interval with respect to and of greater amplitude than said first pulse;

first and second phase splitters having common oppositely phased load circuits;

means for coupling said first amplitude limited rectangular pulse to the input circuit of said first phase splitter to produce a first pair of coincident oppositely phased rectangular voltage pulses across said load circuits;

and means for coupling said second amplitude limited rectangular pulse to the input circuit of said second phase splitter to produce across said load circuits a second pair of oppositely phased coincident rectangular voltage pulses delayed said predetermined interval and of greater amplitude relative to said first pair of coincident pulses.

9. A push-pull deflection pulse generating circuit comprising:

means for producing a first rectangular voltage pulse;

means for producing a second rectangular voltage pulse delayed a predetermined interval with respect to said first pulse;

first and second phase splitters having common oppositely phased load circuits;

means for coupling said first rectangular pulse to the input circuit of said first phase splitter to produce a first pair of coincident oppositely phased rectangular voltage pulses across said load circuits;

means for coupling said second rectangular pulse to the input circuit of said second phase splitter to produce across said load circuits a second pair of oppositely phased coincident rectangular voltage pulses delayed said predetermined interval relative to said first pair of coincident pulses;

voltage clipping means in the output circuits of said first phase splitter for limiting the amplitudes of the pulses of said first pair to predetermined levels;

and voltage clipping means in the output circuits of said second phase splitter for limiting the amplitudes of the pulses of said second pair to levels that are greater than said predetermined levels.

10. A push-pull deflection pulse generating circuit comprising:

means for producing a first rectangular voltage pulse;

means for producing a second rectangular voltage pulse delayed a predetermined interval with respect to and of substantially the same ampitude as said first pulse;

first and second phase splitters having common oppositely phased load circuits;

means for coupling said first rectangular pulse to the input circuit of said first phase splitter to produce a first pair of coincident oppositely phased rectangular voltage pulses across said load circuits;

means for coupling said second rectangular pulse to the input circuit of said second phase splitter to produce across said load circuits a second pair of oppositely phased coincident rectangular voltage pulses delayed said predetermined interval relative to said first pair of coincident pulses;

first voltage clipping means in the output circuits of said first phase splitter for limiting the amplitudes of the pulses of said first pair to predetermined levels;

second voltage clipping means in the output circuits of said second phase splitter for limiting the amplitudes of the pulses of said second pair to levels that are greater than said predetermined levels;

and means for preventing the pulses of said second pair from being clipped by said first voltage clipping means.

References Cited by the Examiner

UNITED STATES PATENTS

| | | | |
|---|---|---|---|
| 2,267,120 | 12/41 | Mathes | 328—171 |
| 2,862,102 | 11/58 | Chrzanowski | 328—60 |

ARTHUR GAUSS, *Primary Examiner.*